United States Patent [19]

Wilson

[11] 3,981,838
[45] Sept. 21, 1976

[54] LUBRICANT FOR POLYVINYL CHLORIDE
[75] Inventor: Alfred P. Wilson, St. Charles, Ill.
[73] Assignee: Standard Oil Company (Indiana), Chicago, Ill.
[22] Filed: Nov. 28, 1975
[21] Appl. No.: 635,851

Related U.S. Application Data

[63] Continuation of Ser. No. 515,437, Oct. 16, 1974, abandoned, which is a continuation-in-part of Ser. No. 373,482, June 25, 1973, abandoned, which is a continuation-in-part of Ser. No. 373,481, June 25, 1973, abandoned.

[52] U.S. Cl. ........................ 260/31.6; 260/31.8 B; 260/475 R; 260/475 P; 264/211
[51] Int. Cl.² .......................................... C08K 5/12

[58] Field of Search ...................... 260/31.6, 475 P

[56] References Cited
UNITED STATES PATENTS

| 3,280,063 | 10/1966 | Zanadski et al. ............... 260/31.8 B |
| 3,654,211 | 4/1972 | Lutz .................................. 260/31.6 |

Primary Examiner—James H. Derrington
Attorney, Agent, or Firm—Wallace L. Oliver; Arthur G. Gilkes; William T. McClain

[57] ABSTRACT

Trimellitic acid di- and tri- diesters, di-ester salts and a mixture of oligomers are used as both internal and external lubricants in processing polyvinyl chloride.

7 Claims, No Drawings

LUBRICANT FOR POLYVINYL CHLORIDE

CROSS REFERENCE TO RELATED APPLICATIONS

This is a continuation of application Ser. No. 515,437, filed Oct. 19, 1974 now abandoned which is a CIP of Ser. No. 373,481 and 373,482 both filed June 25, 1973 now abandoned.

BACKGROUND OF THE INVENTION

This invention relates to processing rigid polymers and more particularly to internal and external lubricants used in extruding rigid polyvinyl chloride (PVC).

The necessity of adding a lubricant to rigid PVC as a process control or aid is well recognized yet remains one of the least understood types of polymer additives. In processing high melt viscosity polymers such as polyvinyl chloride (PVC) by extrusion, milling, calendering and injection molding, the shear forces applied cause excessive frictional heat which may lead to serious thermal stability problems. Another problem in processing PVC is to assure that the polymer releases from metal surfaces of the processing equipment. To solve these problems two types of lubricants are used. Lubricants which lower the melt viscosity and control frictional heat build-up are called internal lubricants while substances which promote release are called external lubricants. These materials are used in relatively small amounts since an excess will cause processing and stability problems and structural weakness in the ultimate product. In the processing of polymers such as PVC discrete particles are subjected to stress and heat until there is fusion of the discrete particle and a resulting loss of particle identity. An excess amount of an external lubricant will tend to coat the individual particles and while promoting a slippage between particles, will delay fusion.

The role of the external lubricant is to reduce the surface tackiness of the polymer, particularly during fabrication, thus reducing the tendency of the polymer to adhere to metallic surfaces. The desired degree of lubricity is something less than total release. Consequently, an external lubricant is functionally distinguishable from a mold release agent which is used to coat the metal surface to promote total release. In addition, the denotative definition of lubricant is inapplicable in that an external lubricant of this invention controls surface friction between a melt and a solid surface by incorporation of the lubricant into the melt rather than control of friction by addition of a lubricant film between solid surfaces. The external lubrication that is referred to in this invention can be most easily established by measuring the time required for a lubricated polymer to exhibit sticking to the metal walls of a dynamic mill at elevated temperatures. Characteristically, as the amount of external lubricant added to the polymer is increased, the adherence of the polymer to metal surfaces, such as mill rollers, will decrease. An over externally lubricated polymer would never show stickiness of softness during processing. If the concentration of external lubricant becomes too high, polymer particles will not fuse into a continuous mass in an extruder.

The role of the internal lubricant is to reduce the internal friction within the polymeric melt, which includes reducing heat build-up when the polymer is subjected to stress. Because of the characteristic high melt viscosities of rigid PVC an internal lubricant is usually viewed as being necessary to improve flow properties. Their use will result in an economic advantage in that less work will be expended at a given set of processing conditions. In addition, improved product appearance usually results, particularly with respect to improved surface appearance. An internal lubricant will promote fusion.

The internal lubricants of this invention are distinguishable from what are classified as plasticizer-type additives in several ways. Ideally the improved flow properties associated with an internal lubricant are observed only under fabricating conditions (elevated temperatures and pressures) without influencing the physical properties of the plastic at ambient conditions. In contrast, plasticized PVC is flexible and pliable at room temperature. A true lubricated PVC should not show softness. The internal lubricant is distinguishable pragmatically from a plasticizer in that it is used in relatively low concentration whereas a plasticized PVC contains relatively large quantities of additive. In fact, the internal lubricants cannot be added to PVC in high concentrations because they are fundamentally incompatible with the plastic while plasticizers are compatible. This compatible/incompatible dichotomy is somewhat analogous to solubility/insolubility categorization but more descriptively a matter of degree of solubility. However, a compound functional as a plasticizer at high concentrations will reduce melt viscosity and thus act as an internal lubricant. At low concentrations in rigid PVC, conventional plasticizers cause embrittlement, reduced impact strength and promote flow which can cause distortions in a rigid structure. These conditions are extremely detrimental in uses such as in PVC pipe. A lack of internal lubrication causes heat buildup in processing and results in a rough surface and degraded product.

Although the mechanism of lubrication is not well understood, certain overall principals have evolved historically. The categories of external vs. internal have been viewed historically as mutually exclusive. This mutual exclusivity was reaffirmed by a mechanistic interpretation which viewed the external lubricant as being incompatible to such an extent that it tends to come to the surface during calendering, extrusion or other processing. Whereas this mechanism could not be tolerated for an internal lubricant which must be incompatible at ambient conditions but compatible under processing conditions. It has been observed that if an external lubricant is present in a PVC composition, addition of an internal lubricant will enhance the effectiveness of the external lubricant.

This has led to the commonly expressed belief that what is required for internal lubrication is a 14 to 18 carbon aliphatic hydrocarbon chain terminated in a highly polar end group (the detergent or soap-like theory). Thus, the salts of fatty acids such as stearates, stearyl alcohols and monoglycerides of fatty acids are known internal lubricants. While the salts of linear aliphatic carboxylic acids of about thirty carbon atoms are external lubricants. The rationale here is that increased polarity and decreased chain length result in improved compatibility. Consistent with this are the known external lubricants such as paraffin wax and polyethylene wax. However, the creditability of any simple explanation based on ionic vs. organic moieties of the same molecule is questionable in view of recent observation. The exact opposite rationale can now be justified in view that it is now known that the divalent salts of linear carboxylic acid of about thirty carbon atoms or two linear aliphatic chains of about thirty carbon atoms each interconnected by an ester linkage will exhibit both internal and external lubricant properties. Also, compounds with two long aliphatic chains of 28 to 32 carbon atoms attached to a polar center with ester and soap-ester groups are known to be internal and external lubricants.

Examples of internal lubricants include monoglycerin esters, stearyl alcohol, and stearic acid. Materials that are useful as external lubricants include paraffin oil, straight chain paraffins and polyethylene wax. Dibasic lead stearate is known to insure good release characteristics in compression molding of phonograph records.

SUMMARY OF THE INVENTION

I have discovered a class of compounds which involve the trimellitic acid moiety that act as both internal and external lubricants in rigid PVC. These compounds are derivatives of trimellitic acid or trimellitic anhydride having the formulae:

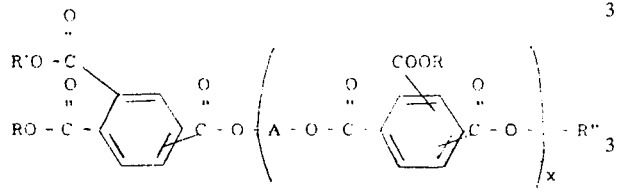

where A = an aliphatic diradical having 2 to 10 carbon atoms; at least two of the R, R' and R'' are selected from the group consisting of various alkyl radicals individually having from 14 to 35 carbon atoms and not more than one of the R, R' and R'' is selected from a group consisting of the radicals containing from 14 to 35 carbon atoms, hydrogen calcium ion and barium ion; and $x = 0$ or a mixture of a plurality of species with $x = 0, 1, 2, 3$ and 4.

DESCRIPTION OF THE INVENTION

My invention involves an improvement in processing rigid polymers in that certain internal-external lubricants are added before processing. By processing, I mean extrusion, calendering, milling and injection molding.

Further, my invention involves combined internal and external lubrication of an unplasticized resin. The unplasticized resins of my invention are rigid polymers with sufficiently high melt viscosities that a lubricant must be added as a processing aid. The new combined internal and external lubricants are diesters, triesters, oligomers and salts of the trimellitate radical having alkyl radicals with at least 14 carbon atoms in length.

These are derivatives of trimellitic acid and trimellitic anhydride having the formula shown above.

These substances can be used to lubricate both internally and externally resins which are characterized as having relatively high melt viscosities by adding an effective lubricating amount of the described lubricant. Since the resin is a high melt viscosity thermoplastic, there is an incentive to add a lubricant as a minor component. The polymers of particular importance to this invention are polyvinyl chloride (PVC) resins, vinyl chloride-vinyl acetate (PVC-VA) resins, acrylonitrile-butadiene-styrene (ABS) resins and methyl methacrylate-butadiene-styrene (MBS) resins. The preferred polymer and the polymer of greatest utility is PVC. Specifically, this discovery relates to the unplasticized PVC resins commonly referred to as rigid PVC. However, all of the aforementioned polymers require lubricants under certain processing conditions, such as extrusion, sheet lubrication and injection molding. Such lubricated polymers can be fabricated into sheet, extruded as profiles (e.g. pipe) as well as injection molded. They are finding increasing use as a replacement for metal pipe, couplings and other applications. They are further characterized as being rigid and stiff at ambient conditions and frequently are stabilized and pigmented by a variety of well-known additives. My invention is especially designed for extrusion of PVC and particularly for extrusion of PVC pipe.

The concept of lubrication of rigid PVC in extrusion is well recognized. Characteristically the concentration of lubricant required is a function of the choice of fabricating process and/or processing conditions. Usually 4 parts of lubricant per hundred parts of resin (phr) or less will be sufficient for most processes. Advantageously, the concentration of lubricant are held below 2 phr with full appreciation that over lubrication will create a plasticizing effect deleterious to the retention of the physical properties characteristic of rigid PVC. The new lubricants of this invention correspond quite closely to the known trends of external lubricant concentrations. Thus an effective lubricating amount means that the lubricant is present in less than 4 phr, preferably below 2 phr and commonly as low as a fraction of a phr as exemplified later. Lubricants of my invention may be combined with other internal or external lubricants to optimize properties in a finished product. A combined internal and external lubricant when formulated with a resin such as rigid PVC, will reduce the energy necessary to extrude the resin while reducing the tendency to stick to metal surfaces in the processing equipment. These properties will be observed when the internal-external lubricant is used alone as well as when it is used in conjunction with other lubricants. The advantage of a combined internal-external lubricant is the lessening or eliminating the need for other lubricating additives.

My invention is useful in extrusion and particularly hot, dry extrusion of plastic. By extrusion, I mean a process of continuous forming of tubes, rods, filaments, films, and shapes having a wide variety of profile. In hot, dry extrusion, heat and mechanical working soften the plastic rather than solvents. In this process polymeric material is fed usually to a machine cylinder, which has controlled temperature zones. One or more rotating screws force the heated plastic through a die orifice which approximates the shape of the desired product after which the extruded form is cooled. The various methods of extrusion are described in Chapter 9 of "Plastic Engineering Handbook," 3rd Edition, 1960 and are incorporated herein by reference. My invention is useful in extruding sheet and film and particularly advantageous in the production of filaments, rods, tubes, and profiles. Another related process for which my invention is useful is calendering.

In one aspect I have discovered that a composition comprising of a vinyl chloride polymer, a vinyl chloride-vinyl acetate copolymer, an acrylonitrile-butadiene-styrene terpolymer or a methyl methacrylate-butadiene-styrene terpolymer and an effective lubricating amount of an esterification product of trimellitic acid, trimellitic anhydride or mixture reacted with aliphatic alcohols containing from 14 to 35 carbon atoms having the formulae:

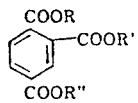

wherein at least two of the R, R' and R'' are each selected from the group consisting of the alkyl radials containing from 14 to 35 carbon atoms and not more than one of the R, R' and R'' is selected from a group consisting of the alkyl radicals containing from 14 to 35 carbon atoms, hydrogen, calcium ion and barium ion possess both internal and external lubrication properties upon processing.

The new lubricants of this invention are predominantly the diesters, triesters and diester salts of trimellitic acid and aliphatic alcohols having at least 14 carbon atoms. More conveniently, they are a mixture of diesters and triesters involving a distribution of alkyl chain lengths. Thus the lubricants can more accurately be described in terms of being an esterification product.

The esterification reaction can be performed by many of the methods well known in the art. Since the reaction products involve rather high molecular weights an organic solvent diluent such as decane can be used. The reaction is preferably catalyzed by the use of $H_2SO_4$ or a tin-containing catalyst. The reaction times are rather long thus the addition of a lower molecular weight alcohol to promote the reaction via transesterification is useful. However, this alcohol will be incorporated into the final lubricant if free carboxyl groups are available. A certain degree of this can be tolerated. Salts of a diester may be formed conveniently by reacting the diester with $Ca(OH)_2$ or $Ba(OH)_2$ in a decane solution. Since calcium and barium ions are divalent, two diester molecules may be linked by one metal ion. The acids used as esterification reactants for this invention can be trimellitic acid, trimellitic anhydride or a mixture of the two. Preferably trimellitic anhydride is used.

The alcohols used as the other esterification reactant are aliphatic alcohols containing 14 to 35 carbon atoms. The preferred alcohols are predominantly the straight chain (linear) alcohols, advantageously the normal alcohols. The presence of some small chain branching and unsaturation is also operative. The alcohol can be a single species or a mixture of various molecular weights. Thus, the so-called fatty alcohols from natural sources with their characteristic distribution of even numbered carbon atoms represent convenient starting materials.

Preferably linear alkyl groups of 16 carbon atoms or greater in length are used. At this level or above both internal and external lubrication properties will result with excellent color properties when used with rigid PVC. Alcohols of 28 carbon atoms or less display reasonable reaction times even when the triester is the product. The preferred range is 16 to 20 carbon atoms.

The final product of the esterification reaction can vary from a liquid to a waxy solid at room temperature. It can be characterized by the following formulae:

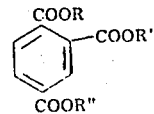

The R's do not have to be identical but on the average at least two of them should be alkyl groups. This can be monitored by measuring the acid number (acid value) of the final product. Acid numbers under 2.5 are arbitrarily viewed as essentially triesters. An acid number greater than that what would correspond to less than two alkyl groups per molecule of TMA will result in a decrease external lubricity. However, this decrease is gradual and such compositions will serve as co-lubricants. The pure diester is approximately as effective as the triester and no decrease in lubricity has been observed which can be attributed to the extra free carboxyl group.

In another aspect, I have discovered that a composition comprising of a vinyl chloride polymer, a vinyl chloride-vinyl acetate copolymer, an acrylonitrile-butadiene-styrene terpolymer or a methyl methacrylate-butadiene-styrene terpolymer and an effective lubricating amount of a reaction product of trimellitic acid, trimellitic anhydride or mixture reacted with a dihydric alcohol having from 2 to 10 carbon atoms reacted with aliphatic mono-alcohols containing from 16 to 35 carbon atoms having the formula:

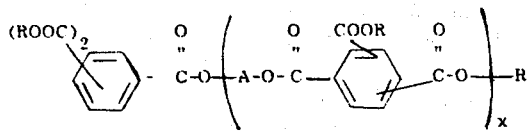

wherein A is an aliphatic diradical having 2 to 10 carbon atoms, $x$ is 0, 1, 2 and 3, and each R is individually selected from a group consisting of the alkyl radicals containing from 16 to 35 carbon atoms and hydrogen possesses both internal and external lubrication properties upon processing.

Another aspect of my invention is that the reaction product of trimellitic acid, trimellitic anhydride or mixture reacted with a dihydric alcohol having from 2 to 10 carbon atoms and reacted with aliphatic monoalcohols containing from 16 to 35 carbon atoms is a new composition which acts as a lubricant for thermoplastics.

The new lubricants of this invention are predominantly a distribution of essentially fully esterified low molecular weight oligomers of a specific polyester. Methods of synthesizing such compounds and the use of certain species as plasticizers for flexible PVC are known in the art and disclosed in U.S. Pat. No. 3,654,211. Although it is well recognized that such compounds (more correctly a mixture or distribution of compounds) can be prepared by heating the three types of reactants (acid, diol, alcohol) together in a single step reaction, it is easier to describe the reaction product in terms of an alternate stepwise synthesis.

This alternate two step description involves first reaction of a dihydric alcohol (diol) wit trimellitic anhydride. Since both reactants have a functionality greater than one, the product of this reaction is a polymer. In this case, a polyester made up of TMA and the dihydric alcohol. The mole ratio of TMA to diol is maintained between 4.0 and 1.6, preferably 2.1 to 1.9. In this manner the polyester product will be limited to the low molecular weight oligomers involving the following formulae:

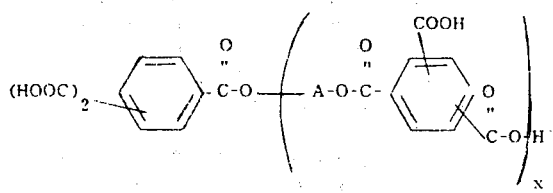

where A is the alkyl diradical associated with the particular choice of dihydric alcohol and $x$ is a distribution of integers ranging from 0 up to 5. The relative concentrations of oligomers can be influenced by the particular choice of mole ratio TMA to diol.

Generally, a mole ratio of TMA to diol of about two results in forming insubstantial amounts of species where x equals five and above, however species where $x$ equals zero through three are present in substantial quantities. As the ratio exceeds 2, the greater is the portion of the lower molecular weight oligomers. Where the ratio equals about 3, it is believed that a majority of the product is monomer. Conversely the lower the ratio, the greater proportions of higher molecular weight oligomers will be formed.

The second step of the two step description is the esterification of the free carboxyl groups by a monofunctional alcohol having at least 16 carbon atoms. Knowing the amount of TMA and diol present the stoichiometric amount of alcohol required can be calculated. A 10 mole percent excess is advantageous in that it tends to drive the reaction to completion. Arbitrarily, an acid value (number) under 10 is considered a fully esterified final product. Thus the lubricants of this invention pragmatically involve a distribution of individual compounds from the fully esterified TMA monomer up to the full esterified pentamer (5 diols and 6 TMA molecules). A fully esterified, isolated oligomer will serve as a lubricant and is within the contemplated scope of this invention.

The reaction can be performed by many of the methods well known in the art, preferably in one step. Since the reaction products involve rather high molecular weights an organic solvent diluent such as decane can be used. The reaction is preferably catalyzed by the use of $H_2SO_4$ or a tin-containing catalyst.

The acids used as esterification reactants for this invention can be trimellitic acid, trimellitic anhydride or a mixture of the two. Preferably trimellitic anhydride is used.

The dihydric alcohols of this invention can be any of the aliphatic diols having up to 10 carbon atoms including such common glycols as ethylene glycol, propylene glycol, 1.4 butane diol and neopentyl glycol. Preferably, neopentyl glycol is used.

The alcohols used as the other esterification reactant are aliphatic alcohols containing 16 to 35 carbon atoms. The preferred alcohols are predominantly the straight chain (linear) alcohols, advantageously the normal alcohols. The presence of some small chain branching and unsaturation is also operative. The alcohol can be a single species or a mixture of various molecular weights. Thus, the so-called fatty alcohols from natural sources with their characteristic distribution of even numbered carbon atoms represent convenient starting materials. Preferably alcohols of 28 carbon atoms or less are used. At this level reasonable reaction times can be achieved.

The final reaction product will generally be a waxy solid at room temperature with possible traces of liquid. It will exhibit both internal and external lubrication properties when used with PVC. The resulting compositions are characterized as processing excellent clarity.

The following examples illustrate specific embodiments of my invention but should not be considered unduly limiting.

EXAMPLES I–X

Five esterification reactions were performed using trimellitic anhydride and primary alcohols with sixteen or more carbon atoms as reactants. Stoichiometric amounts corresponding to the tri-ester were used. A ten mole percent excess of alcohol was added to drive the reaction to completion. In EXAMPLES I, II, VI and VII the excess alcohol was 2-ethylhexanol. The other examples merely had an excess of the alcohol reactant. The distributions of chain lengths of the alcohol reactants are presented in TABLE I.

TABLE I

| (Example) carbon atoms | Chain Length Analysis of alcohols (percent by weight) | | | | |
|---|---|---|---|---|---|
| | I,VI | II,VII | III,VIII | IV,IX | V,X |
| $C_{16}$ | | 34 | 60 | | 52 |
| $C_{18}$ | | 62 | 36 | 97 | 33 |
| $C_{20}$ | 35 | 3 | 3 | | 13 |
| $C_{22}$ | 25 | | | | |
| $C_{24}$ | 20 | | | | |
| $C_{26}$ | 11 | | | | |

The esterification was performed in a glass reactor with a nitrogen sparge at 1 cfm. Decane was used as a diluent to maintain a fluid reaction mixture. The reaction was considered complete at an acid number of less than 2.5 except for EXAMPLE V and X. In V and X, a portion of the product, EXAMPLE V$a$, and X$a$ was removed at a high acid value to determine the effect of a free acid group on the lubrication properties. The esterification of the remaining portion was continued as EXAMPLE V$b$ and X$b$. After completion the esters washed with water and vacuum dried. The reaction parameters are presented in TABLE II.

TABLE II

| | ESTERIFICATION DATA | | | | | |
|---|---|---|---|---|---|---|
| Example | I,VI | II,VII | III,VIII | IV,IX | Va,Xa | Vb,Xb |
| Catalyst type | Tin | Tin | $H_2SO_4$ | $H_2SO_4$ | $H_2SO_4$ | $H_2SO_4$ |
| Temp of Cook °C | 190 | 200 | 180 | 172 | 180 | 180 |
| Reaction time Hrs | 12.75 | 12.5 | 3.5 | 4 | 5.25 | 6.75 |
| Acid Number | 1.2 | 2.4 | 1.5 | 2.2 | 16 | 0.9 |
| Color | dark brown | off white | brown | brown | cream | off white |
| Consistency at 21°C. | thick oil | waxy solid | solid | solid | solid | solid |

Each of the esters produced were blended according to two separate formulations corresponding to typical commercial grades. The first formulation involved for every 100 parts of polyvinyl chloride resin, 2 parts stabilizer, 2 parts $TiO_2$ and 0.75 parts lubricant. The second formulations involved for every 100 parts of polyvinyl chloride resin 1.25 parts stabilizer, 0.4 parts calcium stearate, 2 parts $TiO_2$ and 0.4 parts lubricant. The polyvinyl chloride resin used in each case was a commercial grade sold under the trade name Geon 103EP made by B. F. Goodrich. The particular stabilizer was a sulfur containing organotin compound as described in U.S. Pat. No. 2,648,550. The triesters of TMA of EXAMPLES I through X were the lubricants.

Each formulation was processed on a dynamic mill at 360°F. revolving at a rate of 40 feet per minute until sticking or decomposition occured. As controls, formulations involving two known external lubricants were also run. One was a bis-stearamide wax sold under the trade name Advawax 280 by Cincinnati Milacron Chemicals Inc. and the other was a polyethylene wax. For further comparison, mineral oil, a known lubricant, was tested. The comparative data relating to external lubrication is present in the following TABLE II and TABLE IV. Each of EXAMPLES I through X displayed the characteristics of internally lubricated PVC, such as ease of milling, smooth surfaces and lack of decomposition due to heat build-up in processing.

TABLE III 100 parts polyvinyl chloride
2 parts stabilizer
2 parts $TiO_2$
0.75 parts lubricant mill temp. 360°F.
roll speed 40 fpm

| Lubricant | Advawax[1] 280 | I | II | III | IV | Va | Vb | Mineral Oil | Polyethylene |
|---|---|---|---|---|---|---|---|---|---|
| Time to Sticking (min.) | 20 | 18 | 43 | 40 | 30 | 28 | 30 | 5 | 70+ |
| Color Change | yes | no | yes | no | yes | yes | yes | no | yes |
| Time to Color Change (min.) | 10 | | 20 | | 20 | 20 | 20 | | 20 |
| Color at change | slight yellow | | off white | | off white | very slight yellow | very slight yellow | | off white |
| Color at End of Test | slight yellow | | off white | | off white | very slight yellow | very slight yellow | | slight yellow |

[1] N,N'-ethylene-bis-stearamide

TABLE IV 100 parts polyvinyl chloride
1.25 parts stabilizer
2 parts $TiO_2$
0.4 parts calcium stearate
0.4 parts lubricant mill temp. 360°F.
roll speed 40 fpm

| Lubricant | Advawax 280 | VI | VII | VIII | IX | Xa | Xb | Polyethylene |
|---|---|---|---|---|---|---|---|---|
| Time to Sticking (min.) | 45 | 20 | 50 | 40 | 20 | 25 | 28 | 60 |
| Color Change | yes | yes | yes | yes | yes | yes | yes | yes |
| Time to Color Change | lt. yellow yellow beige | off white | off white | off white | lt. yellow | off white | off white | off white yellow beige |
| Note | | | | | | | | strong odor degradation |

TABLE III shows that the tri-esters of TMA act as external lubricants and display superior color when compared to known external lubricants. TABLE IV demonstrates that these properties are preserved when the triesters of TMA are used with a known co-lubricant calcium stearate.

EXAMPLE XI

In a manner similar to examples I through V the diester of TMA was produced by esterification of exactly 2 moles of a mixture of $C_{16}$ through $C_{18}$ alcohols with 1 mole of TMA. Decane was again used as a diluent and $H_2SO_4$ was the catalyst. After seven hours of esterification at 180°C. the reaction was stopped and the excess decane was removed. However, the waxy product was not washed. The final acid number was 75.

This diester was then blended according to the formulations of EXAMPLES I through X and evaluated on a dynamic mill at 360°F. at a mill speed of 40 fpm. The times to sticking for the two formulations were 30 and 55 minutes. Thus the diesters of TMA serve as external lubricant for PVC.

EXAMPLES XI–XV

To a two liter glass reactor were added two moles of trimellitic anhydride, one mole of neopentyl glycol and four moles (based on the hydroxyl group) of a mixture of $C_{16}$ and $C_{18}$ primary alcohols sold under the trade name of "Alfol" by Conoco Chemicals. To these reactants were added 30 percent by weight decane as a diluent and 0.2 weight percent paratoluene sulfonic acid as catalyst. The reaction proceeded at 180°C for 7 hours under a continuous nitrogen sparge of 1 cfm. At the end of this time a waxy solid was recovered having an acid number of 7.

This reaction product was then blended according to two separate formulations corresponding to typical commercial grades.

The first formulation (EXAMPLE XI) corresponds to a clear commercial grade used primarily for injection molding and blow molding of articles such as bottles. Clarity is of utmost importance in this grade. The specific formulation involves 100 parts of polyvinyl chloride resin, 2 parts stabilizer and 0.75 parts lubricant.

The second formulation (EXAMPLE XIII) involved a typical pigmented product with calcium stearate as a co-lubricant. It involves 100 parts of polyvinyl chloride resin, 2 parts titanium dioxide, 2 parts stabilizer, 0.4 parts calcium stearate and 0.4 parts lubricant.

For comparison purposes a bis-stearamide, sold under the trade name Advawax 280 by Cincinnati Milacron Chemicals Inc., was blended according to the two formulations (EXAMPLE XII and EXAMPLE XIV, respectively). For further comparison a known paraffin wax lubricant was blended according to the second formulation (EXAMPLE XV).

The polyvinyl chloride resin used in each case was a commercial grade sold under the trade name Geon 103EP made by B. F. Goodrich. The particular stabilizer was a sulfur containing organotin compound as described in U.S. Pat. No. 2,648,550.

Each example was processed on a dynamic mill at 360°F, revolving at a rate of 40 feet per minute until sticking or decomposition occurred. The time to sticking as well as the physical appearance as a function of milling time is presented in TABLE V.

TABLE V

| Time (minutes) | EXAMPLE XI | EXAMPLE XII | EXAMPLE XIII | EXAMPLE XIV | EXAMPLE XV |
|---|---|---|---|---|---|
| | Formulation 1 | | Formulation 2 | | |
| 0 | clear | clear | white | white | white |
| 10 | clear | clear | white | off white | cream |
| 20 | | | cream | cream | yellow |
| 30 | | | yellow | yellow | yellow |
| 40 | | | yellow | yellow | yellow |
| 50 | | | yellow | yellow | yellow |
| 55 | | | yellow | yellow | yellow |
| time to sticking | 6 | 8 | 55 | 55 | 55 |

All examples processed exhibited characteristic internal lubrication properties. The time for sticking of EXAMPLE XI when compared to the known commercial alternative. EXAMPLE XII showed no improved lubricity but was definitely commercially competitive with excellent clarity. When used in the second formulation, EXAMPLE XIII, it behaved equivalently in terms of lubricity with slighly superior color properties.

EXAMPLES XVI–XXI

Salts of diesters of trimellitic acid to be used as lubricants were prepared by reacting one-half mole of trimellitic anhydride with one mole of octadecanol and a drop of sulfuric acid as a catalyst in a glass reactor with a nitrogen sparge at 1 cfm in a decane solution at 170°C. One-fourth mole of $Ca(OH)_2$ or $Ba(OH)_2.8H_2O$ was added and reacted for 1 hour after which the mixture was cooled and the solvent evaporated in a flat tray. The results are shown in TABLE VI.

TABLE VI

SALTS OF TMA DIESTERS

| Example | XVI,XVII,XX | XVIII,XIX,XXI |
|---|---|---|
| Metal ion | Ca | Ba |
| Catalyst type | $H_2SO_4$ | $H_2SO_4$ |
| Temp of Cook °C. | 170 | 170 |
| MP °C | 53 | 51 |
| Color | white | white |
| Consistency at 21°C. | hard waxy solid | soft waxy solid |

Both the calcium and barium salts were blended in two separate formulations. In the first formulation 100 parts of polyvinyl chloride resin (Geon 103EP-F5) were blended with 2 parts stabilizer, 2 parts $TiO_2$ and 0.75 part lubricant. The second formulation consisted of 100 parts polyvinyl chloride (Geon 103EP-F76), 1.5 parts stabilizer, 2 parts $TiO_2$, 0.4 part calcium stearate and 0.4 part lubricant. The stabilizer used was a sulfur containing organotin compound described in U.S. Pat. No. 2,648,550. Comparison formulations were blended using as lubricants, calcium stearate (Ca St), a calcium stearate/Advawax 280 mixture and a calcium stearate/paraffin wax mixture (available from Hoechst under the designation XL 165).

The formulations were hand mixed and milled on a two roll mill (8 in. rolls) at 350°F with a roll speed of 44 f.p.m. Samples were removed 5 and 10 minutes after fusion and every 10 minutes thereafter until the sticking point. The samples were compared for color, tackiness to mill rolls and length of time on the rolls. This test is designated to show stability of a lubricated PVC resin. The more effective the internal and external lubrication, the less heat is built up and thus the longer will be the stability times. The results are shown in TABLES VII and VIII.

TABLE VII 100 parts PVC
2 parts stabilizer
2 parts TiO$_2$
0.75 parts lubricant

| Time (after fusion) | Control (Ca St) | EXAMPLE XVI | EXAMPLE XVIII |
|---|---|---|---|
| 0 | white | white | white |
| 5 | white | white | white |
| 10 | off white | off white | off white |
| 20 | lt. cream | lt. cream | off white |
| 30 | lt. cream | sheet switched to back roll | lt. cream |
| 35 | | picking[1] on front roll, cream | lt. cream |
| 40 | picking[1] on front roll, cream | | lt. cream |
| 45 | | | lt. cream |

[1]partial sticking on opposite roll

TABLE VIII 100 parts PVC
2 parts TiO$_2$
1.5 parts stabilizer
0.4 parts Ca St
0.4 parts lubricant

| Time (after fusion) | Control (Ca St/Advawax 280) | Control (Ca St/XL 165) | EXAMPLE XVII | EXAMPLE XIX |
|---|---|---|---|---|
| 0 | white | white | white | white |
| 5 | off white | off white | off white | white |
| 10 | cream | off white | off white | off white |
| 20 | cream | cream | cream | lt. cream |
| 30 | cream | cream | cream | lt. cream |
| 40 | lt. beige[1] | cream | lt. beige[1] | lt. cream |
| 50 | | lt. beige[1] | | lt. cream |

[1]test terminated at light beige color

These tests show that the barium salt is more effective than calcium stearate while the barium salt is slightly less effective. In the mixed lubricant test, the calcium stearate/barium salt was superior to the other systems tested, while the calcium stearate/calcium salt was equivalent to calcium stearate/XL 165 which was more effective than calcium stearate/Advawax 280. It is believed that in a plant operation the stock would not require 40 or 50 minute stability.

EXAMPLES XX–XXIII

Samples of dioctadecyl trimellitate (EXAMPLE XX), its calcium (EXAMPLE XXI) and barium (EXAMPLE XXII) salts and dioctadecyl trimellitate (EXAMPLE XXIII) were prepared as described previously. These lubricants were formulated in a composition with 100 parts of polyvinyl chloride (Ethyl 100), 10 parts of an MBS-type resin useful as an impact modifier (Blendex 425), 2 parts of an acrylic material (Acryloid K-120 N), 2 parts stabilizer (Thermolite 31 Super), 0.5 part partially oxidized polyethylene as an extra external lubricant (Plastiflow POP) and 1 part added lubricant.

The formulations with lubricants corresponding to EXAMPLES XX through XXIII and a control with a castor wax lubricant (Lubricin 25, a product of N L Industries) were mixed in a Henschel blender and tested in a Brabender extruder using a non-vented barrel and a single stage 3/1 screw. The blends were extruded through ⅛ in. and 1/16 in. rod dies at 50 and 100 r.p.m. The torques, die pressures and rates of EXAMPLES XX and the control were found to be similar showing similar lubricating action. EXAMPLES XXI and XXIII were found to give more internal lubrication properties than the control while EXAMPLE XXII showed even more internal lubrication. The formulations of EXAMPLES XXI through XXIII showed higher torques, die pressure and rates than the control which shows a relative decrease in external lubricating properties.

I claim:
1. In extrusion of a rigid polymer selected from the group consisting of vinyl chloride polymer, vinyl chloride-vinyl acetate copolymer, acrylonitrile-butadiene-styrene terpolymer and methylmethacrylate-butadiene-styrene terpolymer, whereby the polymer is forced through an orifice to produce a continuously formed profile, the improvement comprising adding to the polymer before extrusion an effective internal and external lubricating amount of up to 4 phr of a reaction product of (a) trimellitic acid, trimellitic anhydride or a mixture thereof and (b) a dihydric alcohol, in a molar ratio between 1.6 to 1 and 4.0 to 1, and (c) one or more aliphatic mono alcohols, such product having the formulae:

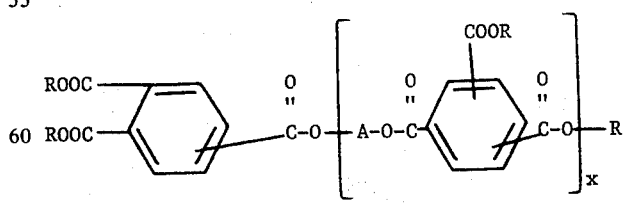

wherein such product comprises a mixture of a plurality of species with $x = 0, 1, 2, 3$ or 4 and where A is an aliphatic diradical containing 2 to 10 carbon atoms, R is individually selected from the group consisting of alkyl radicals containing 16 to 35 carbon atoms and hydrogen.

2. The improvement of claim 1 wherein the rigid polymer is vinyl chloride polymer.

3. The improvement of claim 2 wherein the alkyl radicals contain from 16 to 28 carbon atoms.

4. The improvement of claim 3 wherein the molar ratio of trimellitic acid, trimellitic anhydride or mixture thereof to dihydric alcohol is between 1.9 to 1 to 2.1 to 1.

5. The improvement of claim 4 wherein the reaction product is formed from trimellitic anhydride.

6. The improvement of claim 5 wherein the dihydric alcohol is neopentyl glycol and wherein the alkyl radicals contain from 16 to 20 carbon atoms.

7. The improvement of claim 6 wherein the reaction product comprises a mixture of species with $x$ equal to 0, 1, 2 and 3.

* * * * *

UNITED STATES PATENT OFFICE
CERTIFICATE OF CORRECTION

Patent No. 3,981,838  Dated September 21, 1976

Inventor(s) Alfred P. Wilson

It is certified that error appears in the above-identified patent and that said Letters Patent are hereby corrected as shown below:

| | | | |
|---|---|---|---|
| Column 1, | line | 8 | "Oct. 19, 1974" should be -- Oct. 16, 1974 |
| " 1, | " | 62 | "of" should be -- or |
| " 6, | " | 39 | "carbon atoms reacted" should be -- carbon atoms and reacted |
| " 8, | " | 6 | "1.4 butane" should be -- 1,4 butane |
| " 8, | " | 26 | "with PVC" should be -- with rigid PVC |
| " 10, | " | 23 | "TABLE II" should be -- TABLE III |
| " 11, | " | 35 | "55 minutes" should be -- 55 minutes, respectively |
| " 12, | " | 31 | "alternative." should be -- alternative, |
| " 13, | " | 11 | "designated" should be -- designed |

Signed and Sealed this

Thirtieth Day of November 1976

[SEAL]

Attest:

RUTH C. MASON
Attesting Officer

C. MARSHALL DANN
Commissioner of Patents and Trademarks